United States Patent Office 2,863,866
Patented Dec. 9, 1958

2,863,866
ORGANIC SULFAMOYL AZIDES

William B. Hardy and Frederic H. Adams, Bound Brook, N. J., assignors to American Cyanamid Company, New York, N. Y., a corporation of Maine No Drawing. Application November 15, 1956
Serial No. 622,258

6 Claims. (Cl. 260—247.1)

This invention relates to new compounds. Particularly, it relates to organic sulfamoyl azides having the formula

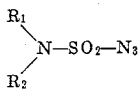

in which $R_1$ and $R_2$ may each represent a lower alkyl radical of 1-6 carbon atoms such as methyl, ethyl, butyl and the like; a cycloalkyl radical such as cyclopentyl or cyclohexyl; or may represent pyrrolidyl, piperidyl or morpholyl when taken together with the nitrogen.

The sulfamyl azides of this invention are useful, among other things, as insecticides, herbicides, polymerization initiators and rubber chemicals. They are particularly effective as blowing agents in the preparation of cellular organo-plastics, particularly rubber.

In general, the alkyl and cycloalkyl derivatives of this invention are prepared by reacting the corresponding sulfamoyl halide with an alkali azide in an aqueous alcoholic solution at from room temperature up to about 50° C. In the preparation of the heterocyclic derivatives, the hydrochloride of the free base is reacted with sulfuryl chloride to give the N-sulfonyl chloride which is then reacted with an alkali azide.

The following examples illustrate the preparation of the compounds of this invention. All parts are by weight unless otherwise indicated.

EXAMPLE 1

*Diethylsulfamoyl azide*

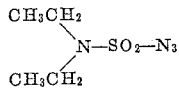

To a solution obtained by warming 18 parts of sodium azide in 50 parts of water is added 82 parts of alcohol and, with stirring at 32° C., a mixture of 35.2 parts of diethylsulfamoyl chloride in 18 parts of alcohol. When the reaction is complete, 200 parts of water are added and the mixture stirred. The colorless heavy oily product is then drawn off and dried over three parts of a drying agent to give a yield of 31.2 parts of product.

EXAMPLE 2

*Dimethylsulfamoyl azide*

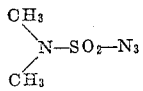

The procedure of Example 1 is repeated except that a chemically equivalent amount of dimethylsulfamoyl chloride is employed. Upon completion of the reaction, the product is recovered and dried in a similar manner.

EXAMPLE 3

*Dipropylsulfamoyl azide*

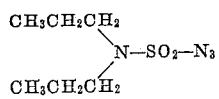

The procedure of Example 1 is again repeated employing a chemically equivalent amount of dipropylsulfamoyl chloride.

EXAMPLE 4

*Dibutylsulfamoyl azide*

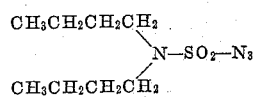

The procedure of Example 1 is again repeated using a chemically equivalent amount of dibutylsulfamoyl chloride.

EXAMPLE 5

*Diamylsulfamoyl azide*

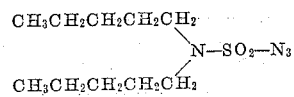

The procedure of Example 1 is again repeated except a chemically equivalent amount of diamylsulfamoyl chloride is employed.

EXAMPLE 6

*Oxy-diethylene-sulfamoyl azide*

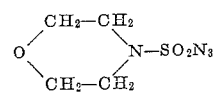

To 219 parts of sulfuryl chloride there is gradually added, with stirring, 70 parts of morpholine hydrochloride, the mixture heated to remove hydrogen chloride, and then drowned in ice water to separate morpholine-N-sulfonyl chloride as a heavy oil. 18.6 parts of this oil is dissolved in an equal weight of ethanol and the resulting solution added gradually with stirring at 30° C. to a solution of 6.5 parts of sodium azide in 17 parts of water and 28 parts of alcohol. The product, oxy-diethylene-sulfamoyl azide, is separated and dried.

EXAMPLE 7

*N-methyl-N-cyclohexylsulfamoyl azide*

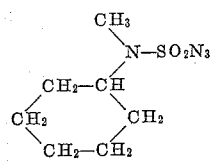

The procedure of Example 6 is repeated except that N-methyl-N-cyclohexylsulfamoyl chloride is prepared instead of morpholine-N-sulfonyl chloride, and a chemically equivalent amount reacted with the sodium azide. The resultant N-methyl-N-cyclohexylsulfamoyl azide is then recovered and dried as before.

EXAMPLE 8

*Dicyclohexylsulfamoyl azide*

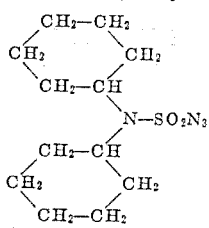

The procedure of Example 6 is again repeated except that dicyclohexylsulfamoyl chloride is prepared. 28 parts of dicyclohexylsulfamoyl chloride is then dissolved in an equal weight of ethanol, and the resulting solution is added gradually with stirring, at 25–35° C., to a solution of 6.5 parts of sodium azide in 17 parts of water and 28 parts of ethanol. After the reaction is complete, the product is separated and dried.

A utility of the compounds of this invention is illustrated by the following example in which rubber is blown to form a cellular product.

EXAMPLE 9

A rubber stock is compounded according to the following composition:

| Compound: | Parts |
|---|---|
| Plasticized rubber | 100 |
| Stearic acid | 2 |
| Zinc oxide | 5 |
| Keystone whiting | 50 |
| Light process aid | 10 |
| Petrolatum | 3 |
| 2,2'-methylene-bis-(4-methyl-6-t-butylphenol) | 0.5 |
| Sulfur | 3 |
| Bis-benzothiazoyl disulfide | 0.6 |
| Di-o-tolyl guanidine | 0.15 |
| Diethylsulfamoyl azide (Example 1) | 1.5 |

Samples of the stock are blown at 130° C. for 60 minutes and at 153° C. for 35 minutes. The mold size is 6 cubic inches and both high (200% expansion) and low (150% expansion) loads are blown at each temperature. In each case, a cellular rubber product is obtained having cells of medium-fine size.

We claim:
1. A compound of the formula

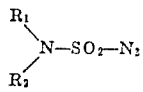

in which $R_1$ and $R_2$ are radicals selected from the group consisting of alkyls of 1–6 carbon atoms; cycloalkyl; and in which $R_1$ and $R_2$ taken together with the nitrogen form a heterocyclic radical selected from the group consisting of pyrrolidyl, piperidyl and morpholyl.
2. Dimethylsulfamoyl azide.
3. Diethylsulfamoyl azide.
4. Oxy-diethylene-sulfamoyl azide.
5. Dicyclohexylsulfamoyl azide.
6. N-methyl-N-cyclohexylsulfamoyl azide.

References Cited in the file of this patent

UNITED STATES PATENTS 2,649,464     Hartley et al.     Aug. 18, 1953

OTHER REFERENCES

Audrieth et al.: "J. Org. Chem.," vol. 21, April 1956, pages 426 to 428.

Oliveri Mandala: Memorie della Reale Accademia Nazionale dei Lincei, Series 6, volume 2 (1926), pages 132 to 135. (Available Smithsonian Institution Nat. Museum.)

Sidwick: Organic Chemistry of Nitrogen (1937), pages 374–375.